United States Patent
Stepanek et al.

(10) Patent No.: US 10,628,587 B2
(45) Date of Patent: Apr. 21, 2020

(54) IDENTIFYING AND HALTING UNKNOWN RANSOMWARE

(71) Applicant: Cisco Technology, Inc., San Jose, CA (US)

(72) Inventors: Michael Joseph Stepanek, Fulton, MD (US); Mohammad Masud Hasan, Laurel, MD (US); Costas Kleopa, Clarksville, MD (US); Shravan Rangaraju, Clarksville, MD (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 15/896,980

(22) Filed: Feb. 14, 2018

(65) Prior Publication Data
US 2019/0251259 A1  Aug. 15, 2019

(51) Int. Cl.
*G06F 21/00* (2013.01)
*G06F 21/56* (2013.01)
(Continued)

(52) U.S. Cl.
CPC ........ *G06F 21/566* (2013.01); *G06F 21/552* (2013.01); *G06F 21/554* (2013.01); *G06F 21/56* (2013.01); *H04L 63/145* (2013.01)

(58) Field of Classification Search
None
See application file for complete search history.

(56) References Cited

U.S. PATENT DOCUMENTS 8,869,277 B2 * 10/2014 Radinsky ............... G06F 21/56
                                                    726/23
9,292,687 B2   3/2016  Thure et al.
(Continued)

FOREIGN PATENT DOCUMENTS

WO   WO-2017053745 A1   3/2017

OTHER PUBLICATIONS

Shaukat, Saiyed Kashif; Rlbeiro, Vinay J. RansomWall: A Layered Defense System Against Cryptographic Ransomware Attacks Using Machine Learning. 2018 10th International Conference on Communication Systems & Networks (COMSNETS). https://ieeexplore.ieee.org/stamp/stamp.jsp?tp=&arnumber=8328219 (Year: 2018).*

(Continued)

*Primary Examiner* — Jeremiah L Avery
(74) *Attorney, Agent, or Firm* — Behmke Innovation Group LLC; James M. Behmke; Jonathon P. Western

(57) ABSTRACT

In one embodiment, a computing device collects ransomware behavioral data of known ransomware, the ransomware behavioral data based on one or more file writing features, and trains a ransomware classifier with the ransomware behavioral data to detect ransomware. The computing device may then share the ransomware classifier with a detection device to cause the detection device to behaviorally detect ransomware based on applying the ransomware classifier to monitored file writing activities. In another embodiment, in response to behaviorally detecting ransomware, based on applying the ransomware classifier to monitored file writing activities, the detection device may then perform one or more ransomware mitigation measures in response to behaviorally detecting ransomware.

20 Claims, 8 Drawing Sheets

(51) Int. Cl.
*H04L 29/06* (2006.01)
*G06F 21/55* (2013.01)

(56) References Cited

U.S. PATENT DOCUMENTS

| | | | |
|---|---|---|---|
| 9,317,686 B1 | 4/2016 | Ye et al. | |
| 9,514,309 B1 | 12/2016 | Mann | |
| 9,734,337 B1 | 8/2017 | Patton et al. | |
| 2008/0016339 A1* | 1/2008 | Shukla | G06F 21/53 713/164 |
| 2009/0300765 A1* | 12/2009 | Moskovitch | G06F 21/562 726/24 |
| 2013/0269043 A1* | 10/2013 | Limaye | G06F 21/10 726/34 |
| 2016/0232353 A1* | 8/2016 | Gupta | G06F 21/566 |
| 2016/0253498 A1* | 9/2016 | Valencia | G06F 21/554 726/23 |
| 2016/0323316 A1 | 11/2016 | Kolton et al. | |
| 2016/0337390 A1* | 11/2016 | Sridhara | G06F 3/0484 |
| 2018/0204002 A1* | 7/2018 | Khorrami | G06F 21/566 |
| 2018/0248896 A1* | 8/2018 | Challita | G06F 21/554 |
| 2019/0205530 A1* | 7/2019 | Brown | G06F 21/53 |

OTHER PUBLICATIONS

Hasan, Md Mahbub; Rahman, Md. Mahbubur. RansHunt: A Support Vector Machines Based Ransomware Analysis Framework with Integrated Feature Set. 2017 20th International Conference of Computer and Information Technology (ICCIT). https://ieeexplore.ieee.org/stamp/stamp.jsp?tp=&arnumber=8281835 (Year: 2017).*
Ahmadian, Mohammad Mehdi et al. Connection-Monitor&Connection-Breaker: A Novel Approach for Prevention and Detection of High Survivable Ransomwares. 2015 12th International Iranian Society of Cryptology Conference. https://ieeexplore.ieee.org/stamp/stamp.jsp?tp=&arnumber=7387902 (Year: 2015).*
"FAQ—RansomFree", https://ransomfree.cybereason.com/faq/, Accessed on Oct. 4, 2017, 1 page, Cybereason.
"RansomFree by Cybereason", https://ransomfree.cybereason.com, Accessed on Oct. 4, 2017, 1 page, Cybereason.

* cited by examiner

IDENTIFYING AND HALTING UNKNOWN RANSOMWARE

TECHNICAL FIELD

The present disclosure relates generally to computer networks, and, more particularly, to identifying and halting unknown ransomware.

BACKGROUND

As will be readily understood by those skilled in the art (and to the public, in general), ransomware is becoming increasingly prevalent. Ransomware, generally, is a particular type of malicious software (e.g., from cryptovirology) that threatens to publish the victim's data or perpetually block access to it unless a ransom is paid. While some simple ransomware may lock the system in a way which is not difficult for a knowledgeable person to reverse, more advanced malware uses a technique called cryptoviral extortion, in which it encrypts the victim's files, making them inaccessible, and demands a ransom payment to decrypt them. Though ransomware attacks are typically carried out using a Trojan that is disguised as a legitimate file that the user is tricked into downloading or opening when it arrives as an email attachment, other ransomware attacks can travel automatically between computers without user interaction.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing device collects ransomware behavioral data of known ransomware, the ransomware behavioral data based on one or more file writing features, and trains a ransomware classifier with the ransomware behavioral data to detect ransomware. The computing device may then share the ransomware classifier with a detection device to cause the detection device to behaviorally detect ransomware based on applying the ransomware classifier to monitored file writing activities.

According to one or more additional embodiments of the disclosure, a detection device receives a ransomware classifier, the ransomware classifier trained to detect ransomware by ransomware behavioral data of known ransomware based on one or more file writing features, and monitors file writing activities on files in a storage system associated with the detection device. In response to behaviorally detecting ransomware, based on applying the ransomware classifier to monitored file writing activities, the detection device may then perform one or more ransomware mitigation measures in response to behaviorally detecting ransomware.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
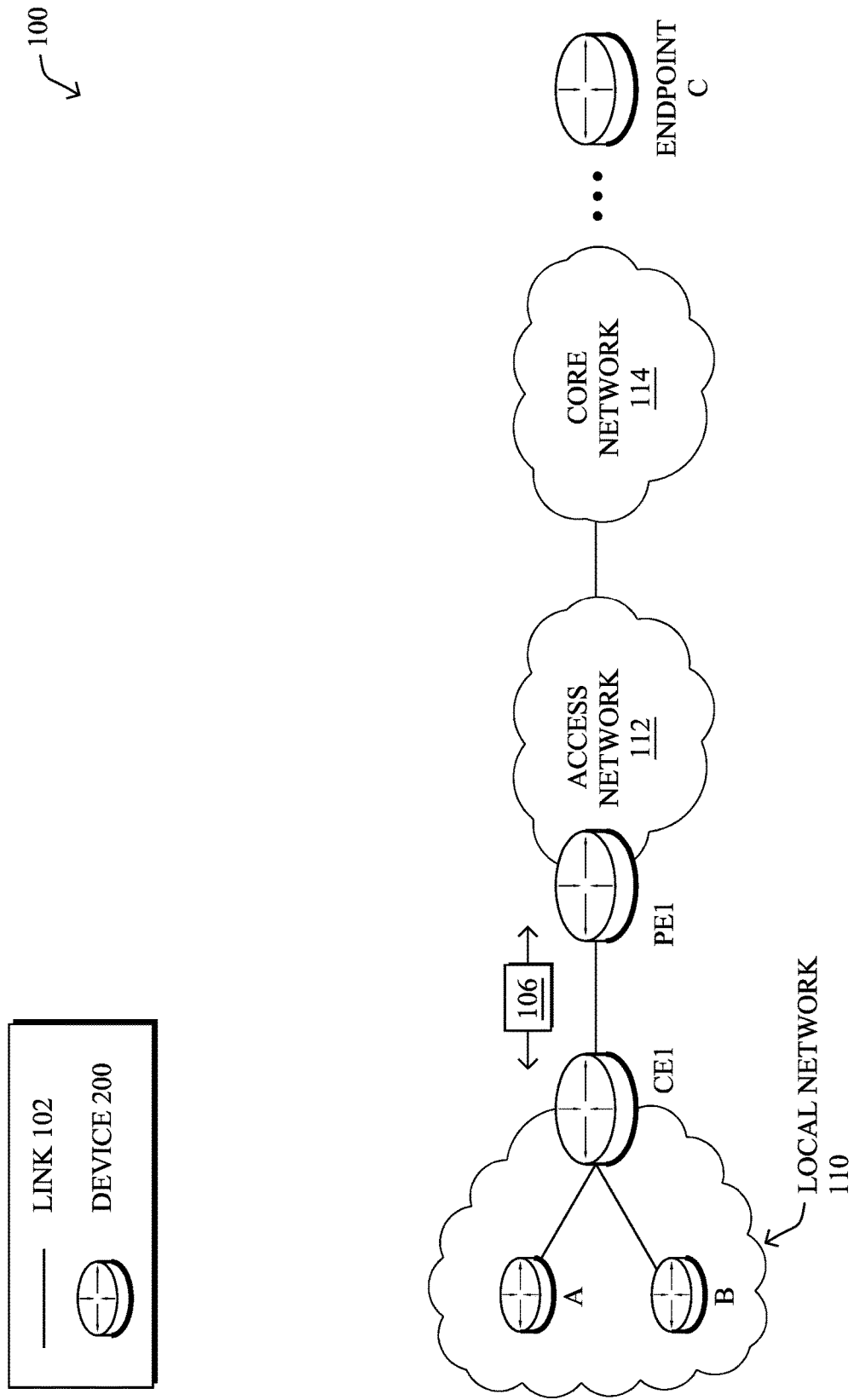
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
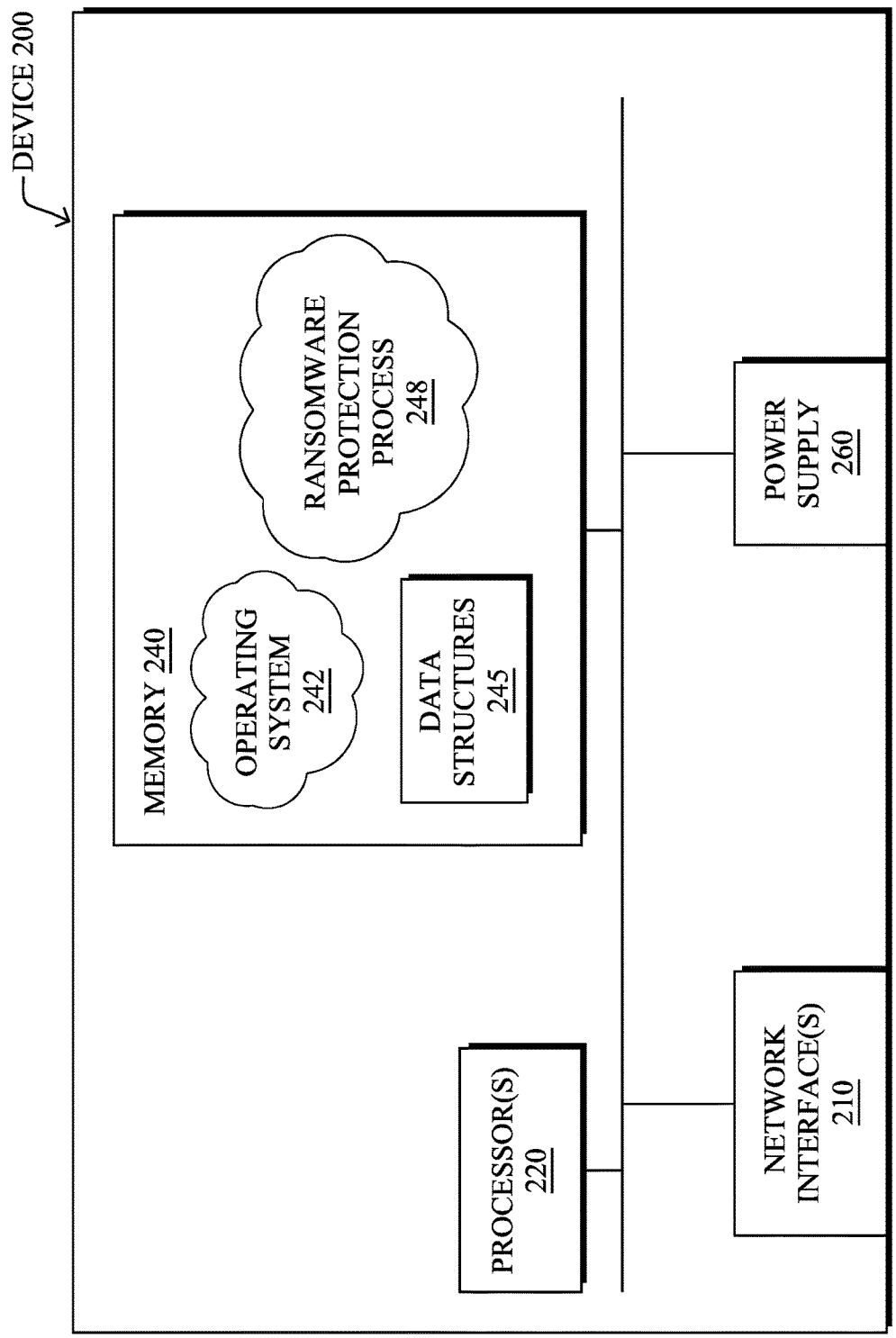
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a ransomware protection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, machine learning techniques may be utilized to perform some of the embodiments described herein. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

Identifying and Halting Unknown Ransomware

As noted above, ransomware is a particular type of malware that attacks a victim's data to either publish it or block access to it unless a ransom is paid. Ransomware can be crippling to the victim, and the longer ransomware has to propagate through the victim's storage system and file directories, the wide-sweeping the damage can be. Ransomware attacks can often be disguised as legitimate files (e.g., Trojans) that are downloaded by a user, or else can travel automatically between computers without user interaction. In general, though, the behavior of ransomware can adapt over time to thwart detection attempts.

The techniques herein seek to identify ransomware attacks on any endpoints, and to prevent it from proceeding once identified. In particular, the techniques described below look at the behavior of how individual processes are accessing a disk in order to determine if the process is suspected as ransomware. As soon as ransomware is suspected, the process could be halted, and the user could be warned and/or prompted for follow-on actions. Said differently, machine learning classifiers may be trained specific to ransomware behaviors based on data features worth monitoring, and then exported to endpoints to use local classifier-based machine learning techniques to detect that ransomware is happening in real-time when some process or other activity appears to be acting like ransomware according to the classifiers.

Specifically, according to one or more embodiments of the disclosure as described in detail below, a computing device collects ransomware behavioral data of known ransomware, the ransomware behavioral data based on one or more file writing features, and trains a ransomware classifier with the ransomware behavioral data to detect ransomware. The computing device may then share the ransomware classifier with a detection device to cause the detection device to behaviorally detect ransomware based on applying the ransomware classifier to monitored file writing activities. In one or more additional embodiments as described in detail below, in response to behaviorally detecting ransomware, based on applying the ransomware classifier to monitored file writing activities, the detection device may then perform one or more ransomware mitigation measures in response to behaviorally detecting ransomware.

Illustratively, the techniques described herein may be performed by hardware, software, and/or firmware, such as in accordance with the ransomware protection process 248, which may include computer executable instructions executed by the processor 220 to perform functions relating to the techniques described herein, e.g., on any suitable security device (e.g., the host device, a server, an edge device, a firewall, etc.), in conjunction other processes and/or devices, accordingly.

Operationally, the techniques herein look at the behavior of how individual processes are accessing a storage system (e.g., disk, file system, repository, etc.) in order to determine if a particular process is suspected as ransomware. As soon as ransomware is suspected, the process could be halted, and the user could be warned and/or prompted for follow-on actions.

Figure 3A:
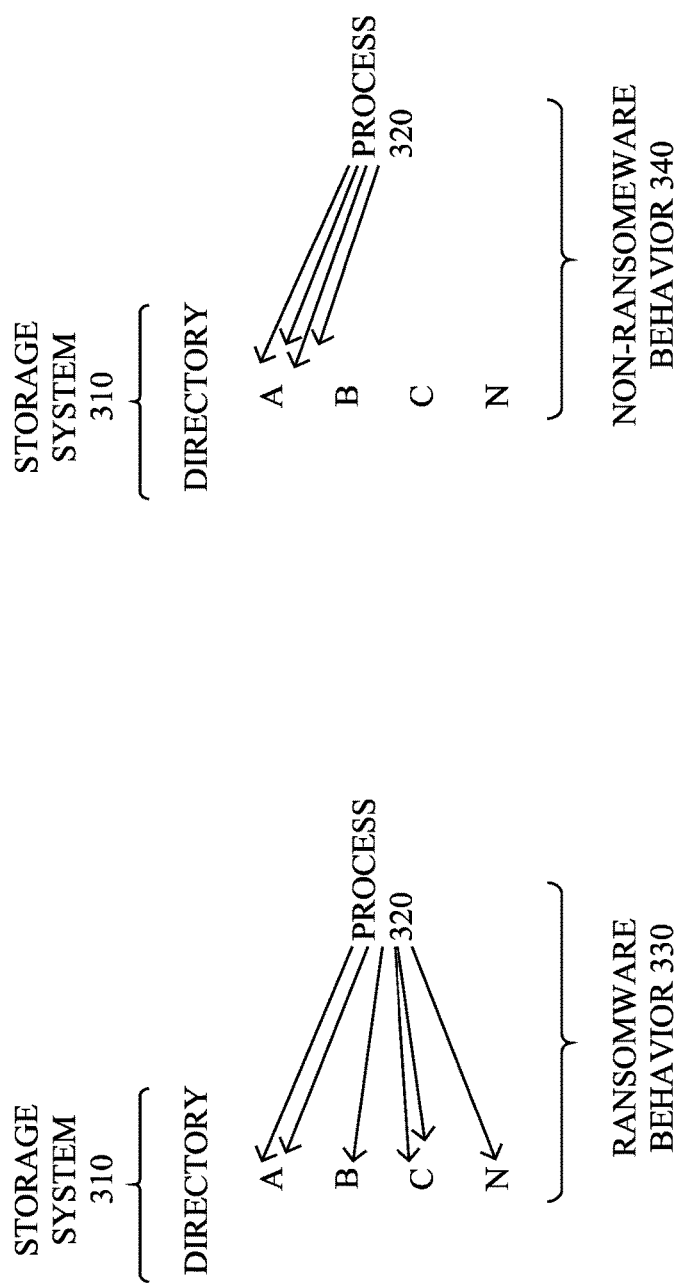
FIGS. 3A-3C illustrate examples of ransomware behavior.
Figure 3B:
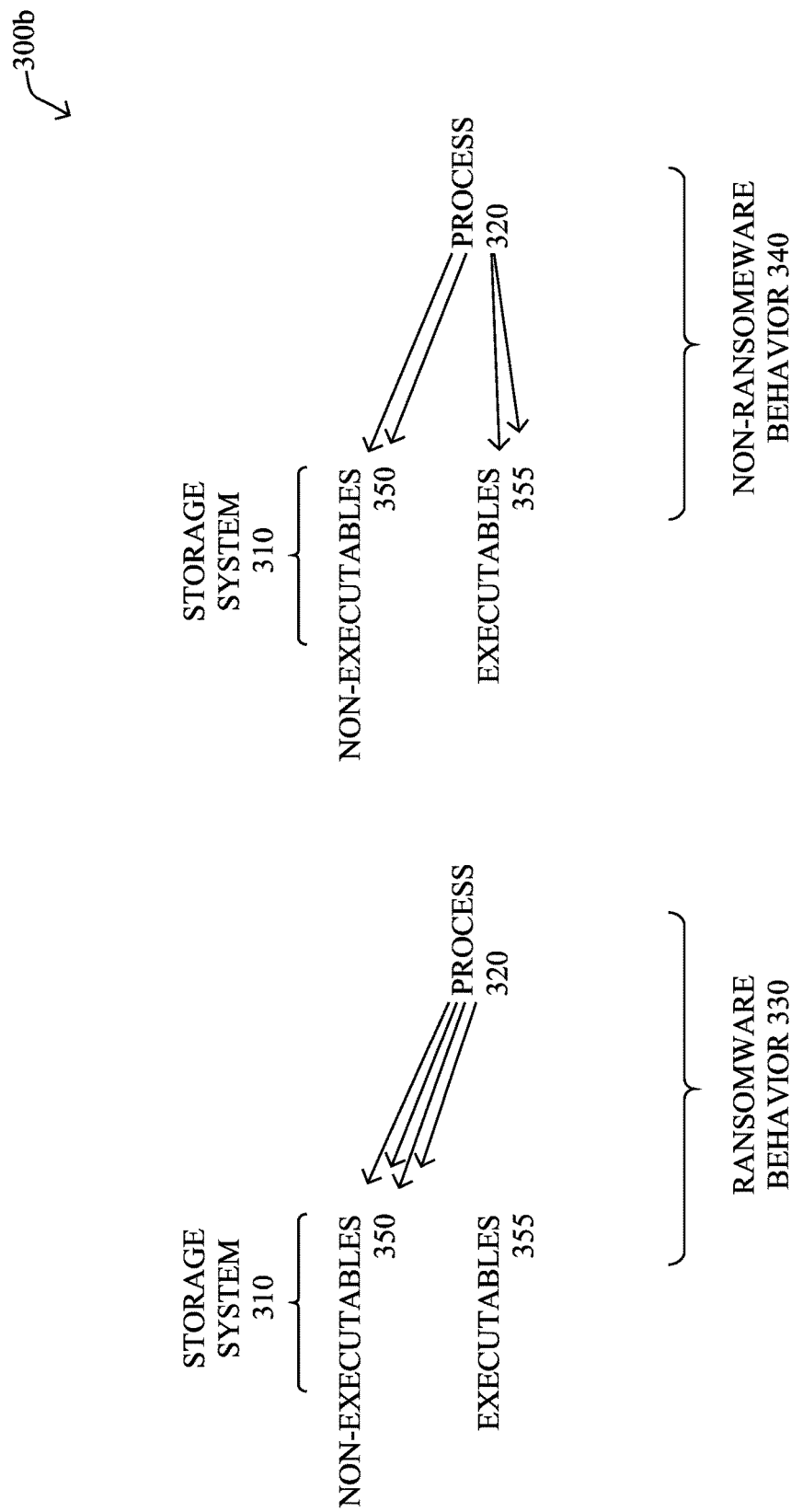
Figure 3C:
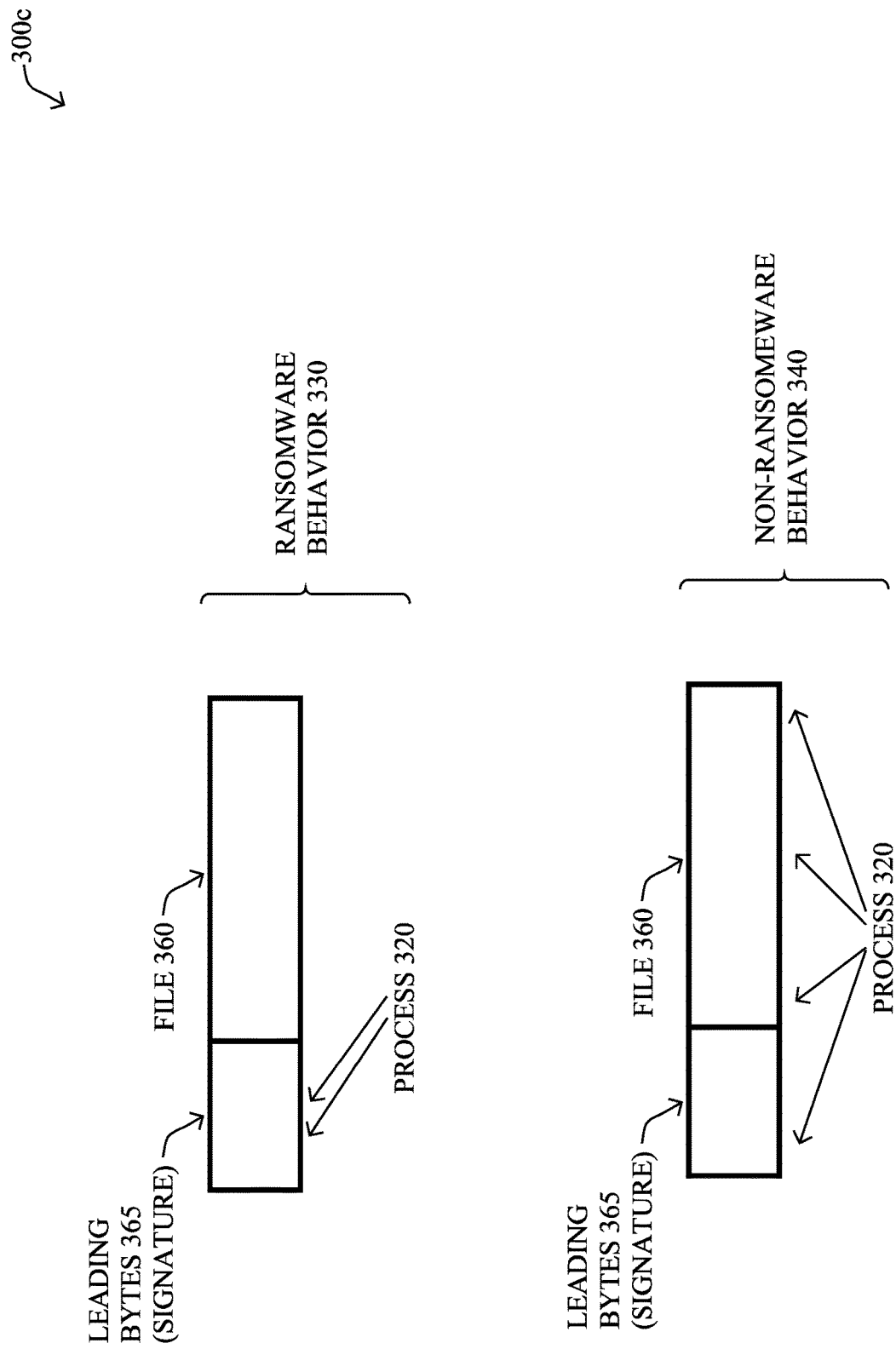

The algorithms herein are intended to identify general ransomware behaviors such as the following, as represented by FIGS. 3A-3C:

- As represented in illustration 300a of FIG. 3A, given a storage system 310 (directory, file locations A-N, etc.) and a process 320 accessing the storage system, ransomware behavior 330 would tend to wander "aimlessly" (haphazardly) around the storage system (e.g., across folders A-D), while normal (non-ransomware) applications 340 would tend to remain within their expected area within a directory structure (e.g., within a particular folder A). Also, normal applications 340 would generally tend to deal with a limited number of file types (at least for well-known file types).
- As represented in illustration 300b of FIG. 3B, ransomware behavior 330 tends to target well-known non-executable files 350. To be effective, a ransomware program would prefer to encrypt non-executable files such as documents, family photos, financial statements, spreadsheets, and so on. Likewise, ransomware would prefer to leave executable files 355 intact such that the system is still operational (i.e., the user can use the computer just enough to see that files have been encrypted and now has the ability to pay the fee for the decryption key). Non-ransomware behavior 340, on the other hand, may change executables, or smaller numbers of non-executables during a period of time. Certain non-ransomware may write to many non-executables (e.g., lots of photos), but the behavioral differentiation may be detectable based on other factors, such as the types of non-executables (e.g., rarely would non-ransomware change many photos and documents at the same time).
- As represented in illustration 300c of FIG. 3C, a lot of common file types have a well-known signature 365 in the first so many bytes of the file 360. If the signature of a file is not present for that file type (has been "corrupted"), a reasonable assumption might be that the file has been encrypted by ransomware behavior. On the other hand, a non-ransomware process behavior would generally write the entire file 360, and would also recreate (or leave intact) the signature 365, accordingly.
- Other ransomware and non-ransomware behaviors can be configured, detected, learned, etc., and those illustrated and explained above are merely examples to demonstrate certain known and typical ransomware behaviors.

Combinations of the behaviors, as well as particular nuances within the behaviors (e.g., specific file types, specific frequencies of access, etc.) may be determined and used according to machine learning techniques herein.

According to the techniques herein, a classifier may be built up offline based on the behavior of a plurality of known ransomware packages (e.g., compared against non-ransomware applications). On an endpoint, then, this classifier information could be used to monitor real-time file writing activity (on a disk or other storage system) to detect general ransomware behavior of a process.

The classifier may be trained based on any suitable number of data features, such as, for example:

1. Absolute path of files being read and written by a process.
2. Filenames being written (file extension/type in particular).
3. First N bytes of data being written to files.
4. Process name.
5. The frequency of different file accesses.
6. The Operating System (OS) information.

According to one or more particular embodiments herein, these example features (and others) may be processed before being presented to the classifier, for efficiency, reduced processing requirements, and so on. That is, the following example actions could be performed to pre-process the data being given to the machine-learning classifier:

1. Absolute paths: Instead of absolute paths, the techniques herein may look at the number of unique paths used by a process (a single count).
2. File names/extensions: Instead of filenames/extensions, the techniques herein may use an array of counts for well-known file extensions (e.g., and an "other" category for less-well-known extensions). In one embodiment, this may be normalized to get a percentage of each file type accessed instead.
3. First N bytes written: This data feature could be per file extension type. For space-saving purposes, it could simply be a recording of the last M files of each type (e.g., with some type of well-known marker (such as all-zeros) for "none" accessed). As an even bigger space-saving measure, one embodiment could save off the header bytes of the last M files written regardless of file extensions (knowing that the well-known types would all fall into a bucket of a handful of possible headers).
4. Process names: Process names could be simplified to a string for the process name performing the disk access.
5. Frequency: This feature may be based on times between file accesses using Markov chain binning.
6. OS: Different behaviors and/or features could be identified based on the operating system being used.

Figure 4:
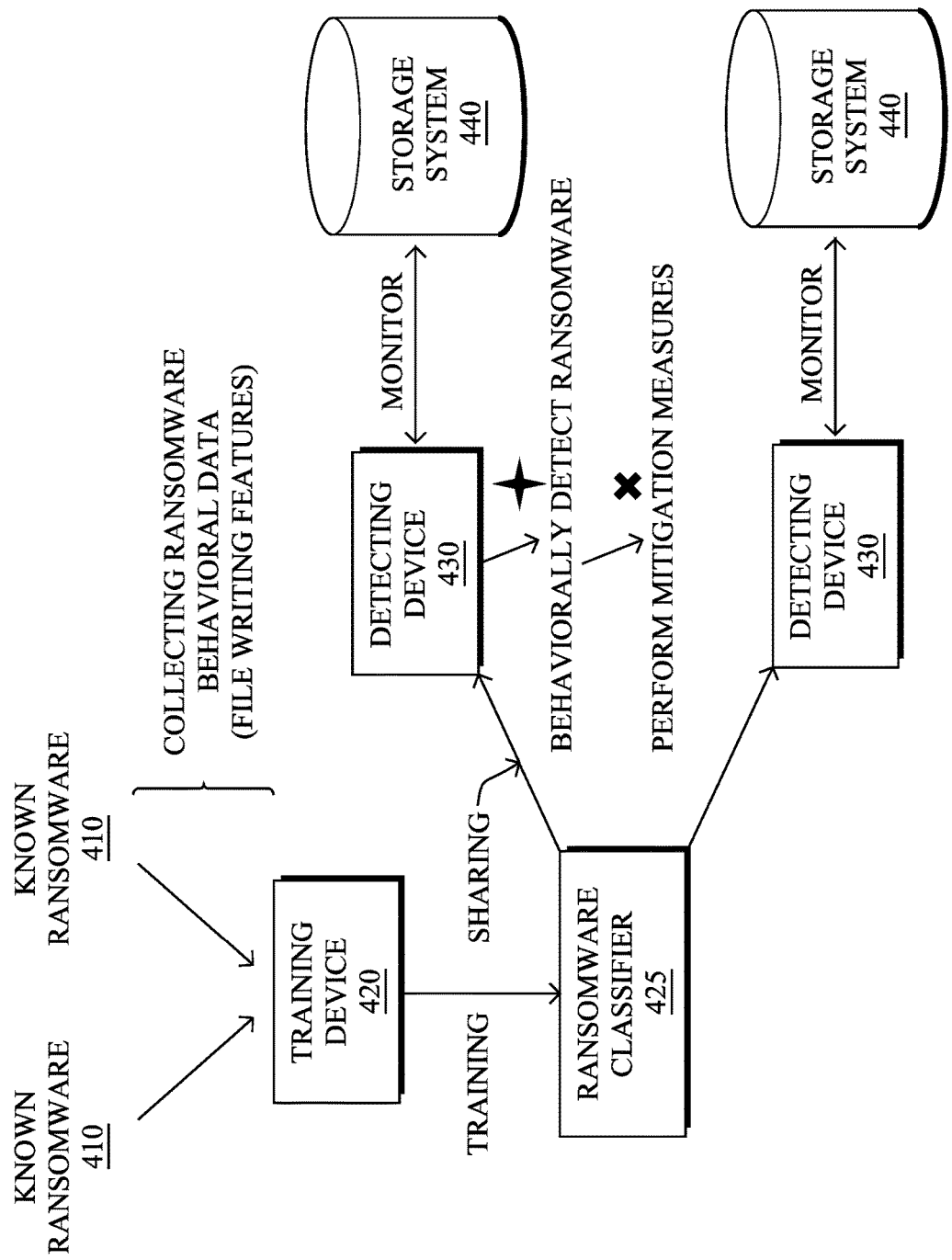
FIG. 4 illustrates an example system for identifying and halting unknown ransomware.

According to one or more embodiments of the techniques herein, and with reference to system 400 of FIG. 4, known ransomware data (e.g., those above and other suitable data) may be collected for all of the known malware flavors (e.g., as seen in operation on test hosts). That data would be the input for a machine learning algorithm on a training device 420, illustratively a supervised learning system, to create a ransomware classifier 425 that can distinguish between ransomware and non-ransomware with some acceptable precision. From this classifier, parameters and weights can be established for each feature collected by the machine learning algorithm, in order to best classify the ransomware (e.g., determining that some features are better indicators of ransomware than others, or some features when found in certain combinations are better indicators than other combinations or other features on their own).

The classifier 425 (e.g., the parameters and weights) may then be distributed (and updated over time, e.g., via subscription) to a monitoring software package on the detecting device 430 (e.g., possibly bundled with an existing malware suite). During operation, on the detecting device, the features relevant to the classifier 425 would be collected (e.g., on a per-process basis) from storage system 440, and run through the classifier. In one embodiment, the classifier may be applied continually, while in another embodiment it may be applied periodically (e.g., for performance). In still another embodiment, the classifier may be applied after some level of disk access has been achieved, or other triggers (e.g., manual or automatic).

Notably, the detecting device 430 may be a host device (e.g., endpoint), such as a personal computer or workstation. As such, the storage system 440 could be a local disk, where per-process data collection could be performed. As another example, the techniques herein may relate to cloud-based devices 430 for cloud-based storage systems 440 (e.g., particularly specifying a repository to monitor). In this case, there may not be access to process names/IDs, but typically a user identifier would be available. In such cases, the techniques herein may be adapted to group and inspect data on a per-user basis.

If ransomware is detected (behaviorally detecting ransomware using the classifier), then the detecting device can perform one or more ransomware mitigation measures. For example, the techniques herein could choose to halt the ransomware process in its tracks and/or prompt a user for how to proceed.

Figure 5:
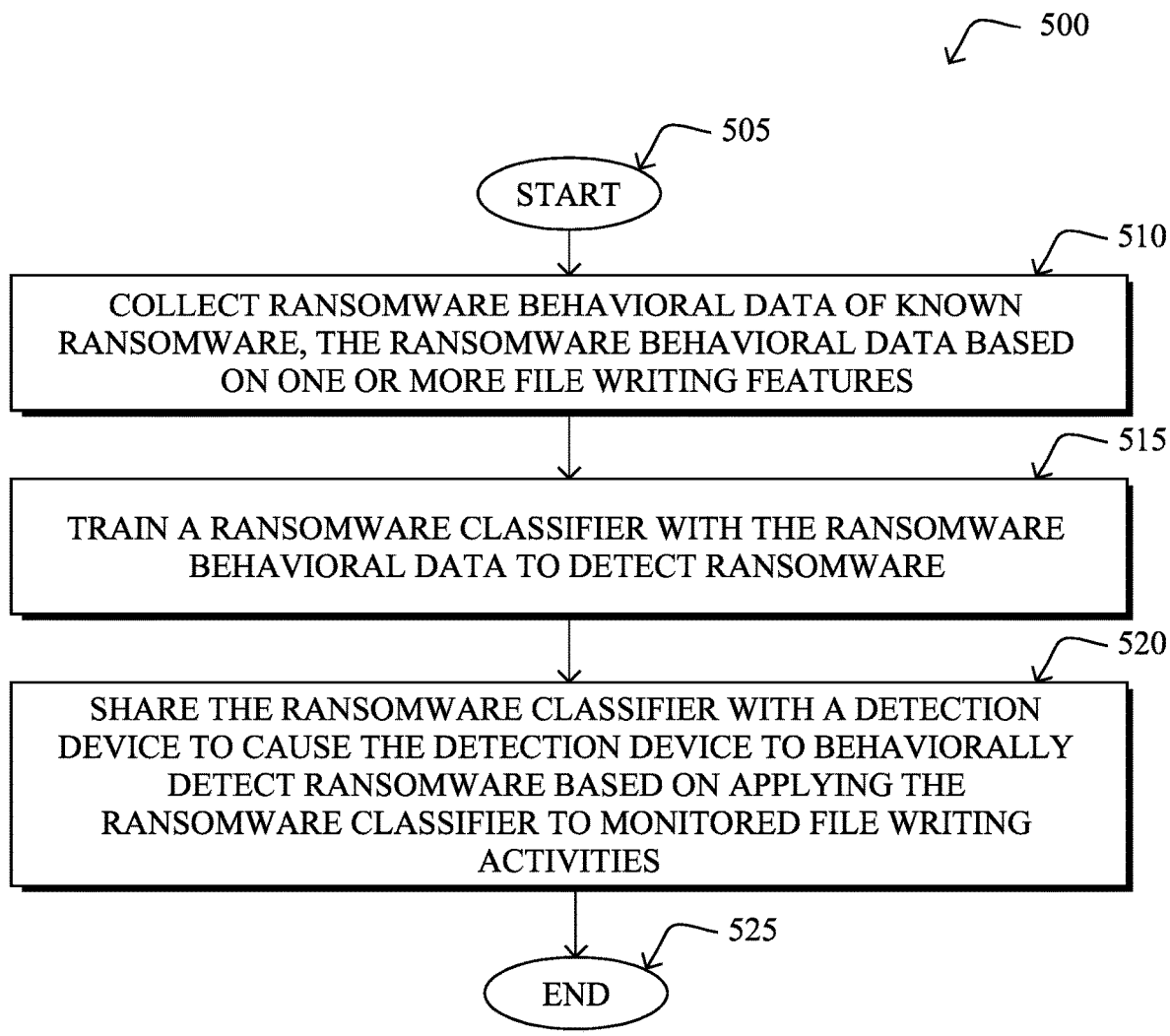
FIG. 5 illustrates an example simplified procedure for identifying and halting unknown ransomware, particularly from the perspective of a training device.

FIG. 5 illustrates an example simplified procedure for identifying and halting unknown ransomware in accordance with one or more embodiments described herein, particularly from the perspective of a training device 420. For example, a non-generic, specifically configured device (e.g., device 200) may perform procedure 500 by executing stored instructions (e.g., ransomware protection process 248). The procedure 500 may start at step 505, and continues to step 510, where, as described in greater detail above, a computing device (training device 420) collects ransomware behavioral data 410 of known ransomware, the ransomware behavioral data based on one or more file writing features. Example file writing features associated with ransomware behavioral data may be such things as paths of files being written, number of paths used by a particular process, filenames of files being written, number of filenames being written, leading set of bytes being written, leading set of bytes being written per file type, process name performing writing, frequency of different file accesses, operating system information, and so on.

In step 515, a ransomware classifier 425 may then be trained with the ransomware behavioral data to detect ransomware, such as various behaviors as mentioned above (e.g., behavior related to haphazard wandering of file writing across a storage system by ransomware, file writing activity across a wide variety of file types, file writing activity on non-executable file types typical to ransomware (e.g., documents, photos, spreadsheets, financial statements, etc.), file writing that leaves executable files intact, presence of particular signatures within a leading set of bytes of files being written, and son on).

Once the ransomware classifier is trained, then in step 520 the computing (training) device can share the ransomware classifier the with a detection device 430 to cause the detection device to behaviorally detect ransomware based on applying the ransomware classifier to monitored file writing activities (e.g., on storage system 440). The procedure 500 may then end in step 525, notably with the ability to retrain the classifier over time and redistribute the newly trained classifier in order to adapt to newly discovered ransomware behaviors.

Figure 6:
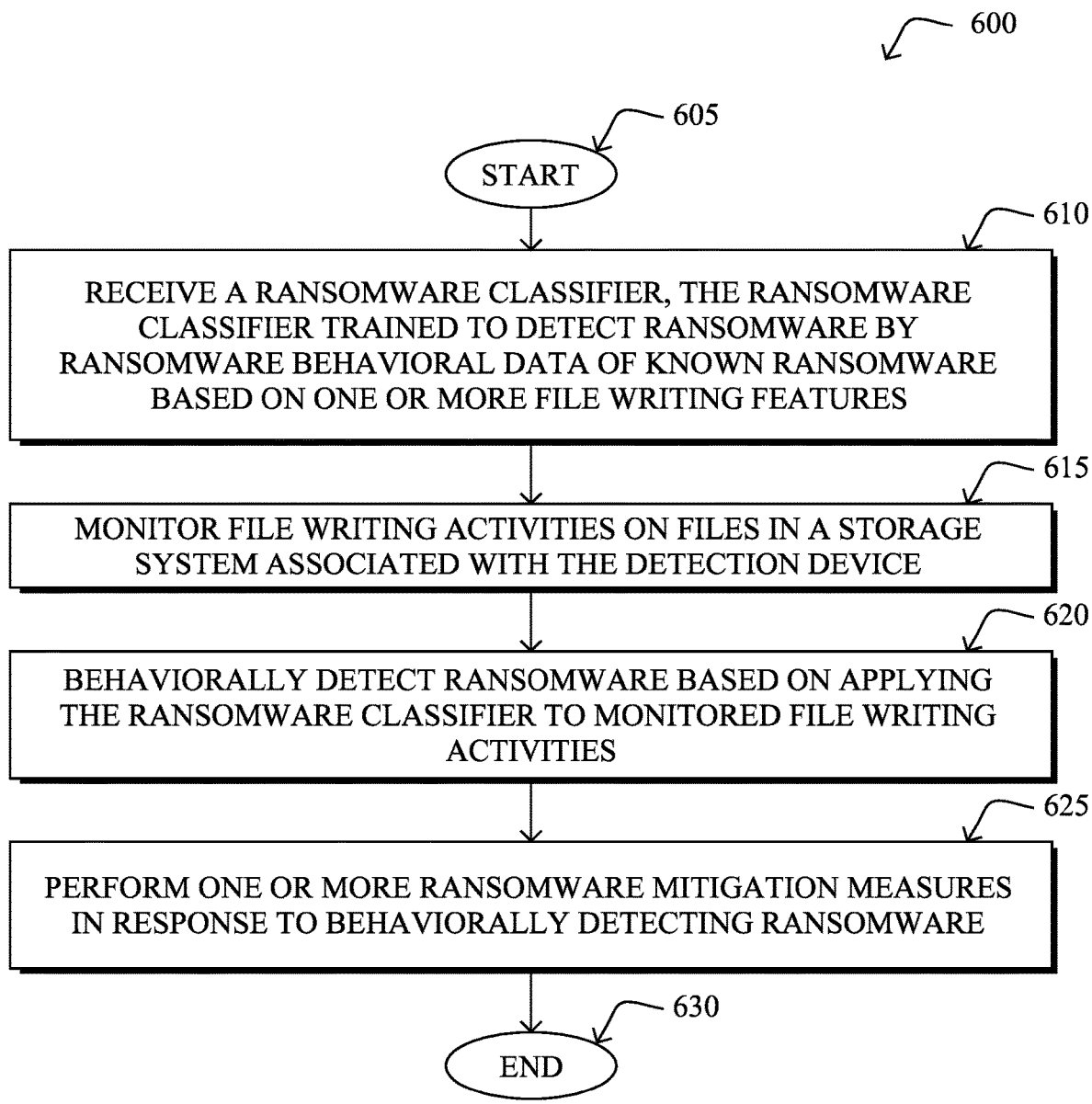
FIG. 6 illustrates another example simplified procedure for identifying and halting unknown ransomware, particularly from the perspective of a detecting device.

In addition, FIG. 6 illustrates another example simplified procedure for identifying and halting unknown ransomware in accordance with one or more embodiments described herein, particularly from the perspective of a detecting device 430. Again, a non-generic, specifically configured device (e.g., device 200) may perform procedure 600 by executing stored instructions (e.g., ransomware protection process 248, now configured on a detecting device 430). As noted above, the detection device may be a host computer configured to monitor file writing activities of processes of a storage system (e.g., disk) of the host computer, while in another embodiment it may be a cloud computer configured to monitor file writing activities of a cloud storage system.

The procedure 600 may start at step 605, and continues to step 610, where, as described in greater detail above, the detection device receives a ransomware classifier 425 (e.g., from procedure 500 of FIG. 5 above), where as noted above, the ransomware classifier is trained to detect ransomware by ransomware behavioral data of known ransomware based on one or more file writing features. In step 615, then, the detection device may monitor file writing activities on files in a storage system 440 associated with the detection device (e.g., inspecting the file writing activities on a per-process or per-user basis, particularly for cloud-based storage when the monitored file writing activities are contained within a specified cloud storage repository).

In step 620, the detection device may then apply the ransomware classifier to monitored file writing activities to behaviorally detect ransomware, such that in response to behaviorally detecting ransomware, then in step 625 the detection device can perform one or more ransomware mitigation measures (e.g., halting the ransomware, generating alerts, and so on). The simplified procedure 600 may then end in step 630, with the ability to continue monitoring for ransomware, receive updated classifiers, etc.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for identifying and halting unknown ransomware. In particular, the techniques herein provide a robust mechanism to detect the activity of ransomware, and prevent it from further damaging activity before it spreads any further throughout the file system or database. Notably, the techniques are specifically tailored to address ransomware, which has its own nuances over typical malware techniques. For instance, ransomware is based on file directory behavior, and not individual file-by-file behavior as in typical malware. Furthermore, current techniques for addressing ransomware merely compare before-and-after versions of files to check for encryption (i.e., an algorithmic approach to file comparison), and do not provide a file-signature-based machine learning approach to monitor for ransomware activity (i.e., behavior-based alerting) according to the techniques herein. Other techniques are based on "bait files", watching for those files to be encrypted, but such simplistic techniques can be easily defeated by adjusting the behavior of existing ransomware. By taking a behavior-based approach to solve the problem, the techniques herein can adapt over time to changes in learned ransomware behavior.

While there have been shown and described illustrative embodiments that provide for identifying and halting unknown ransomware, it is to be understood that various other adaptations and modifications may be made within the spirit and scope of the embodiments herein. For example, while certain embodiments are described herein with respect to using certain models, features, labels, data, etc., for purposes of describing and/or detecting ransomware, the techniques herein are not limited as such and may be used with other particulars, in other embodiments. In addition, while certain protocols are shown, such as IP, HTTP, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   collecting, by a computing device, ransomware behavioral data of known ransomware, the ransomware behavioral data based on one or more file writing features;
   training, by the computing device, a ransomware classifier with the ransomware behavioral data to detect ransomware; and
   sharing, by the computing device, the ransomware classifier with a detection device to cause the detection device to behaviorally detect ransomware based on applying the ransomware classifier to monitored file writing activities.

2. The method as in claim 1, wherein the detection device comprises a host computer configured to monitor file writing activities of processes of a storage system of the host computer.

3. The method as in claim 1, wherein the detection device comprises a cloud computer configured to monitor file writing activities of a cloud storage system.

4. The method as in claim 3, wherein the file writing activities are inspected on a per-user basis.

5. The method as in claim 3, wherein the monitored file writing activities are contained within a specified cloud storage repository.

6. The method as in claim 1, wherein the one or more file writing features associated with the ransomware behavioral data are selected from a group consisting of: paths of files being written; number of paths used by a particular process; filenames of files being written; number of filenames being written; leading set of bytes being written; leading set of bytes being written per file type; process name performing writing; frequency of different file accesses; and operating system information.

7. The method as in claim 1, wherein the ransomware behavioral data comprises behavior related to haphazard wandering of file writing across a storage system by ransomware.

8. The method as in claim 1, wherein the ransomware behavioral data comprises behavior related to file writing activity across a wide variety of file types.

9. The method as in claim 1, wherein the ransomware behavioral data comprises behavior related to file writing activity on non-executable file types typical to ransomware.

10. The method as in claim 1, wherein the non-executable file types are selected from a group consisting of: documents; photos; spreadsheets; and financial statements.

11. The method as in claim 1, wherein the ransomware behavioral data comprises behavior related to file writing that leaves executable files intact.

12. The method as in claim 1, wherein the ransomware behavioral data comprises behavior related to presence of particular signatures within a leading set of bytes of files being written.

13. The method as in claim 1, wherein the detection device comprises a cloud computer configured to monitor file writing activities of a cloud storage system.

14. A tangible, non-transitory, computer-readable medium storing program instructions that cause a computer to execute a process comprising:
   collecting ransomware behavioral data of known ransomware, the ransomware behavioral data based on one or more file writing features;
   training a ransomware classifier with the ransomware behavioral data to detect ransomware; and
   sharing the ransomware classifier with a detection device to cause the detection device to behaviorally detect ransomware based on applying the ransomware classifier to monitored file writing activities.

15. The computer-readable media as in claim 14, wherein the detection device comprises a host computer configured to monitor file writing activities of processes of a storage system of the host computer.

16. The computer-readable media as in claim 14, wherein the detection device comprises a cloud computer configured to monitor file writing activities of a cloud storage system.

17. The computer-readable media as in claim 14, wherein the one or more file writing features associated with the ransomware behavioral data are selected from a group consisting of: paths of files being written; number of paths used by a particular process; filenames of files being written; number of filenames being written; leading set of bytes being written; leading set of bytes being written per file type; process name performing writing; frequency of different file accesses; and operating system information.

18. The computer-readable media as in claim 14, wherein the ransomware behavioral data comprises behavior related to one or more of: haphazard wandering of file writing across a storage system by ransomware, file writing activity across a wide variety of file types, file writing activity on non-executable file types typical to ransomware, file writing that leaves executable files intact, and presence of particular signatures within a leading set of bytes of files being written.

19. A method, comprising:
   receiving, by a detection device, a ransomware classifier, the ransomware classifier trained to detect ransomware by ransomware behavioral data of known ransomware based on one or more file writing features;

monitoring, by the detection device, file writing activities on files in a storage system associated with the detection device;

behaviorally detecting ransomware, by the detection device, based on applying the ransomware classifier to monitored file writing activities; and performing, by the detection device, one or more ransomware mitigation measures in response to behaviorally detecting ransomware.

20. The method as in claim 19, wherein the detection device comprises a host computer configured to monitor file writing activities of processes of a storage system of the host computer.

\* \* \* \* \*